United States Patent [19]

Annas, Sr. et al.

[11] Patent Number: 4,850,471
[45] Date of Patent: Jul. 25, 1989

[54] CONVEYOR SYSTEM WITH A MECHANICAL BRAIN

[75] Inventors: Dulin L. Annas, Sr., Hickory; Richard M. Teague, Taylorsville, both of N.C.

[73] Assignee: Anteg, Inc., Hickory, N.C.

[21] Appl. No.: 189,948

[22] Filed: May 3, 1988

Related U.S. Application Data

[62] Division of Ser. No. 38,786, Apr. 15, 1987, Pat. No. 4,764,647.

[51] Int. Cl.$^4$ ............................................. B65G 43/08
[52] U.S. Cl. .................................. 198/349.3; 198/358; 198/372
[58] Field of Search .................. 198/349.3, 372, 356, 198/358

[56] References Cited

U.S. PATENT DOCUMENTS

| | | |
|---|---|---|
| 1,262,271 | 4/1918 | Schumaker . |
| 1,528,227 | 3/1925 | Spooner ............................ 198/349.3 |
| 2,809,741 | 10/1957 | Keilig ................................. 198/372 |
| 2,971,660 | 2/1961 | Lash et al. ........................ 198/349.3 |
| 3,012,680 | 12/1961 | Mulvany ........................... 198/349.3 |
| 3,093,236 | 6/1963 | McLaughlin ........................ 198/356 |
| 3,160,729 | 12/1964 | Lapham ............................ 198/349.3 |
| 3,181,685 | 5/1965 | Brunner et al. ..................... 198/372 |
| 3,279,583 | 10/1966 | Abegglen ........................ 198/356 X |
| 4,468,165 | 8/1984 | Kawasaki ........................... 414/417 |
| 4,552,260 | 11/1985 | Teagno et al. ...................... 198/345 |
| 4,671,402 | 6/1987 | Inoue ............................... 198/465.3 |

FOREIGN PATENT DOCUMENTS 2444535 12/1978 France .
5869606 10/1981 Japan .
59-114206 7/1984 Japan .

Primary Examiner—Frank E. Werner
Assistant Examiner—Cheryl L. Gastineau
Attorney, Agent, or Firm—Roy B. Moffitt

[57] ABSTRACT

A conveyor system for delivering work pieces to a predetermined area comprising a first conveyor, a second conveyor disposed at an angle to the first conveyor, a mechanical brain, and a transfer apparatus (arm) at the juncture of the first and second conveyors. The mechanical brain has a shim, a rotating disk and sliding plates on the disc that are temporarily moveable to form a protrusion that rotates with the disc. The disc rotates at a speed that is a function of the speed of the first conveyor and the protrusion activates a device to create a light path transverse to the first conveyor near the first and secured conveyor juncture just prior to a workpiece entering such juncture. The protrusion is returned to its normal state, subsequent to the creation of the light path, by the coaction of the rotating disk and the shim. The workpiece interrupts the light path causing the transfer apparatus (an arm) to divert the workpiece to the second conveyor and upon the reestablishment of the light path, the arm is caused to retract.

10 Claims, 8 Drawing Sheets

CONVEYOR SYSTEM WITH A MECHANICAL BRAIN

This is a division of U.S. Ser. No. 083,786 filed April 15, 1987, entitled conveyor System with a Mechamical Brain, now U.S. Pat. No. 4,764,647.

RELATED PATENT APPLICATIONS:

This application deals with the same general subject matter as disclosed in our co-pending application entitled "Conveyor", filed Nov. 28, 1986, Ser. No. 06/936,109 now U.S. Pat. No. 4,739,60.

BACKGROUND OF THE INVENTION

In the furniture industry a piece of upholstered furniture is customarily packaged by heat shrinking a heat sheet of plastic onto a piece of furniture. This is usually accomplished by draping a heat shrinkable piece of plastic over the piece of furniture (workpiece) and then conveying the draped workpiece into a furnace where hot air at approximately 375° F. is blown causing the plastic to shrink and take the shape of the outside contour of the workpiece. Known prior art employing this process uses a conveyor to convey draped furniture to a furnace, a conveyor to convey the plastic-draped workpiece through the furnace; and another conveyor to convey the packaged workpiece (piece of furniture about which plastic has been shrunk) from the furnace to a storage area. Throughout this application, the conveyor that conveys the workpiece to the furnace, the furnace conveyor and the conveyor that conveys packaged workpiece from the furnace will be referred to collectively as the first conveyor.

One of the problems in using this type of prior art apparatus is the distribution of the number of packaged workpieces after they are discharged from the furnace. More often than not, there is a need for a particular packaged workpiece to be shunted to a first predetermined area and another following packaged workpiece would need to be shunted to a second predetermined area. There may be a plurality of predetermined areas into which packaged workpieces are sought to be diposed or stored for subsequent shipping.

At first glance, this problem would appear to be easily solved by a combination of photoelectric cells, arms and a number of conveyors disposed at an angle to the first conveyor. It was initially thought that a uniquely marked packaged workpiece could be detected by a light beam from a first photoelectric device thus causing an activation of a second photoelectric device. The interruption of a light path created by this second photoelectric device (transverse to the first conveyor) would cause an arm to be moved to a position transverse to the first conveyor. Such would result in the uniquely marked packaged workpiece being shunted onto another conveyor disposed at an angle to the first conveyor. Non-uniquely marked packaged workpieces would not be detected by the first photoelectric device and thus they would continue to travel in the path of the first conveyor. Once tried, however, this solution failed. Apparently such failure was because the light beam of the first photoelectric device was not sufficiently responsive to the uniquely-marked plastic on the packaged workpieces. Various attempts were made to solve this problem by placing sticker, paint, other indicia on the plastic, all to no avail.

To solve this problem, some method had to be devised to turn on a particular photoelectric device just prior to a given workpiece coming into the juncture of the first conveyor with another conveyor serving a predetermined area. Once turned on, breaking of this light path causes an arm to be moved from a first (non-obstructive) to a second (obstructive) position to shunt the workpiece onto another conveyor. After passage of the workpiece past the light path, the light path is obviously reestablished and such would cause the arm to move from its second to its first position and by so doing turn off the photoelectric device. It is towards the solution of this problem that this invention is directed.

BRIEF DESCRIPTION OF THE INVENTION

The invention is a mechanical brain conveyor system combination composed of first and second conveyors, each having a longitudinal axis, the longitudinal axis of the second conveyor being disposed at an angle to the longitudinal axis of the first conveyor. Pivotally attached to the first conveyor and in close proximity to the second conveyor is an arm, responsive to a signal arising out of a light path created by a photoelectric device being interrupted by a packaged workpiece. Interruption of the light path crosses the arm to be moved from a first to a second position; and, in response to the re-establishment of the circuit (packaged workpiece being removed from the path of the light beam) the arm is moved from its second to its first position. The first position is essentially parallel to the londitudinal axis of the first conveyor and not interruptive to the line of travel of the workpieces. The second position is tranverse to the longitudinal axis of the first conveyor and interruptive to the line of workpiece travel on the first conveyor. When the arm is in its second position, packaged workpieces conveyed by the first conveyor are shunted onto the second conveyor. The photoelectric device is in electrical communication with the arm and a mechanical brain is used to selectively turn on the photoelectric device just prior to a workpiece approaching the second conveyor.

A control switch, located in the area where the unpackaged furniture workpieces are initially placed on the first conveyor, is in communication with the mechanical brain. The mechanical brain, usually disposed downstream from the furnace, is in communication with the photoelectric cell and the control switch. When the conveyor switch is activated, a part of the mechanical brain is temporily physically deformed to form a protrusion. The protrusion turns on a switch which activates the photoelectric device by a packaged workpiece, a circuit is closed causing the arm to be moved from its first (obstructive) to its second (obstructive) position, or otherwise biased in that position if it is there initially. When a workpiece clears the light path thus reestablishing it, the arm is responsive to be moved from its second to its first position, or otherwise it is biased to its first and non-obstructive position if it is there initially.

The mechanical brain is made up of a rotatable disc, a plurality of plate members in a first position movably disposed on the periphery of the disc. These plate members are adapted to be temporarily diplaced to a second position and moved back to their first position. Also included is a striker member, disposed in confronting relationship to the plate members and in communication with and responsive to the control switch. Upon activating the control switch, the striker member moves a certain number of the plates from their first to the second position thus causing a protrusion. The disc rotates, and the protrusion activates a switch in the brain (brain switch), which in turn activates the photoelectric cell to create a light path as previously discussed. Rotation of the disc is a function of the speed of the travel of the first conveyor, the position of the second conveyor, and the length of travel a workpiece must travel to reach the second conveyor so that the protrusion caused by the striker member activates (turns on) the brain switch (and thus the photoelectric device) just prior to a packaged workpiece entering the intersection of the first and second conveyors. After the brain switch is turned "on", a shim in the brain comes in contact with the protrusion thus moving the plate members of the protrusion from their second to their first position so that they may be deformed again in a predetermined manner by a striker member.

DETAILED DESCRIPTION OF THE INVENTION

Figure 1:
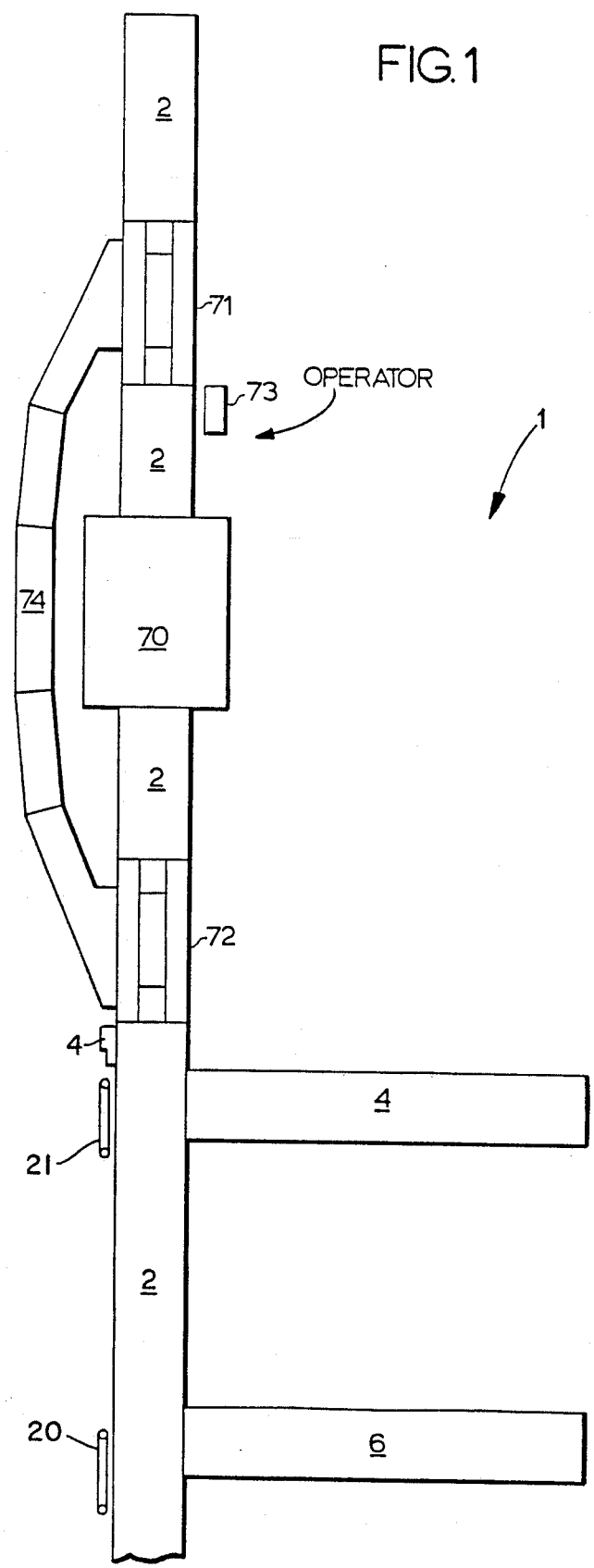
FIG. 1 is a schematic plan view of a conveyor mechanical brain combination of the instant invention.

The conveyor system contemplated by the present invention is represented generally by element 1 of FIG. 1. Element 1 is composed of a first conveyor 2 and second and third conveyors 4 and 6 respectively. First conveyor 2 has a longitudinal axis. Second and third conveyors 4 and 6 also have longitudinal axis disposed at an angle to the longitudinal axis of the first conveyor. At the junctures of conveyors 4 and 6 with conveyor 2 there is a pivotably mounted transfer mechanism (an arm) adapted to shunt a packaged piece of furniture (packaged workpiece) from its travel along the longitudinal axis of conveyor 2 (from top to bottom in FIG. 1 and from left to right in FIG. 2) on to either conveyor 4 and 6 as determined by an operator located at a location denoted by the word "Operator".

Figure 2:
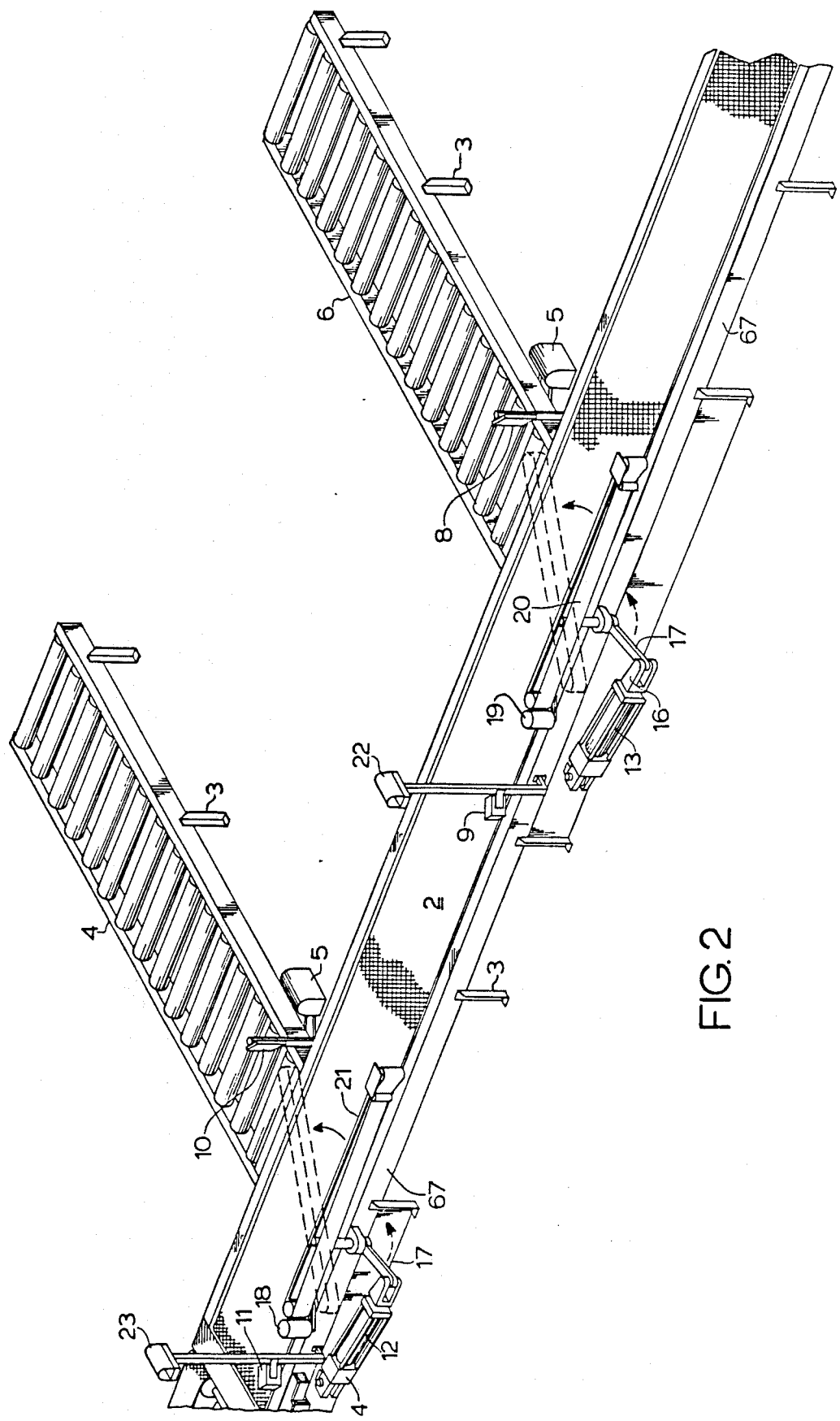
FIG. 2 is a partial perspective view of the combination of FIG. 1.
Figure 3:
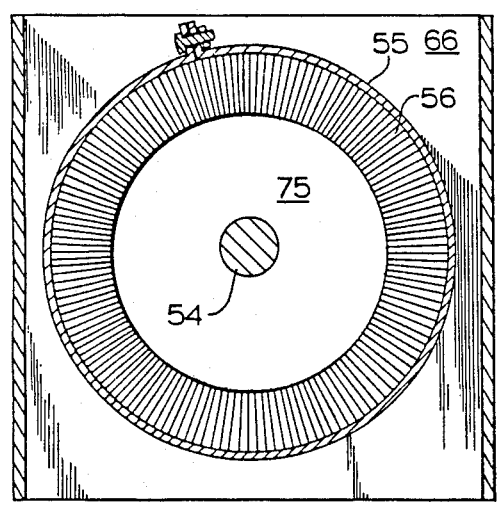
FIG. 3 is a front elevation cut-a-way view of a disc and plates diposed on the periphery of the disc forming a part of the mechanical brain.
Figure 6:
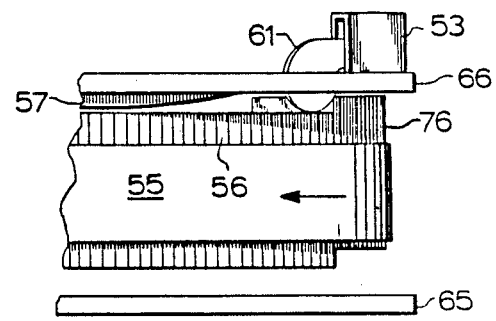
FIGS. 6 and 7 are partial plan views of the disc, plates and brain switch of the mechanical brain.
Figure 4:
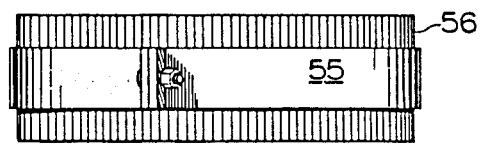
FIG. 4 is a plan view of the disc and plate members of FIG. 3.
Figure 7:
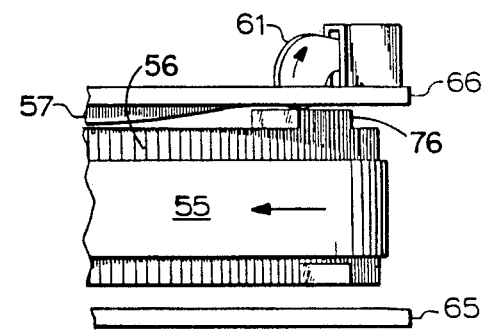
Figure 5:
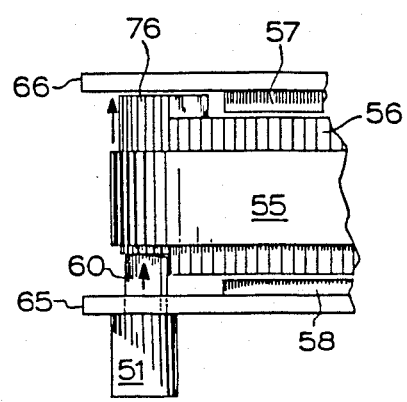
FIG. 5 is a fragmented plan view of a striker member of the mechanical brain moving a certain number of the plates relative to the balance of the plates to form a protrusion.
Figure 8:
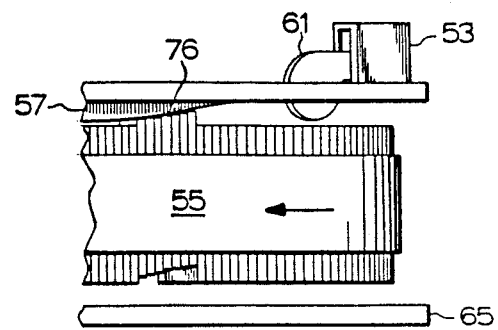
FIG. 8 is a partial plan view of a shim in the mechanical brain returning the certain number of plates forming the protrusion of FIG. 5 to their normal position of FIG. 4.
Figure 9:
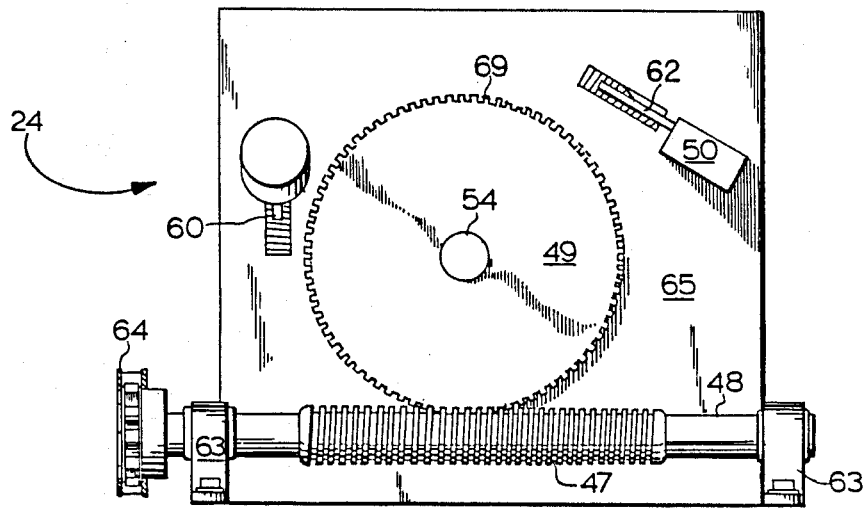
FIGS. 9 and 10 are detailed front elevation and side views respectively of the mechanical brain of FIG. 3.

Upstream from the apparatus of FIG. 2 is furnace 70 and a loading station 71. Near loading station 71 an operator makes a determination that a given workpiece, sought to be packaged, is to be transferred, after the packaging operation, to service area served by either conveyor 4 or conveyor 6. One should understand that a transfer mechanism (arm) is associated with each conveyor, like conveyor 4 or 6, to serve a plurality of individual service areas of arbitrary selection.

The conveyor system of the present invention operates as follows: Workpieces are disposed on a pallet (not shown), draped with a heat shrinkable plastic at loading station 71. Pallet and draped workpiece are conveyed by a conveyor into and through furnace 70 where heated air is blown against the draped workpiece. In furnace 70 the plastic is heat shrunk onto the workpiece to form a packaged workpiece. Subsequently, the packaged workpiece is conveyed out of furnace 70, and after the pallet is removed at unloading station 72 from the packaged workpiece, the pallet is returned (by conveyor 74) to the initial loading point and the packaged workpiece is sent downstream on conveyor 2. This method and apparatus for carrying it out are described in detail in our co-pending application Ser. No. 06/936,109 now U.S. Pat. No. 4,739,607. What happens to the packaged workpiece subsequent to pallet removal at unloading station 72 forms the subject matter of this invention and involves the apparatus of FIGS. 2-13. The apparatus of FIG. 2 represents the apparatus just immediately downstream of the pallet removal station 72 of FIG. 1.

An operator at the initial loading station 71 makes a decision that a given packaged workpiece will be sent to a given service area served by either conveyor 4 or 6. The operator puts this decision into action by turning on the appropriate on-off switch (element 77 or 78) in control 73. First control on-off switch 77 is in pneumatic communication with first striker 51 of brain 24. Second control on-off switch 78 is in pneumatic communication with second striker 52 in brain 24. Brain 24 (as will be later explained) activates a photoelectric device that creates a light path transverse to the longitudinal axis of conveyor 2, namely between elements 9 and 8 or 11 and 10 and turns on repsective station light 22 or 23. A packaged workpiece traveling on conveyor 2 breaks this light path, which causes either arms 20 or 21 to move from a first (shown as solid lines in FIG. 2) to a second position (shown in dotted lines in FIG. 2) transverse to the longitudinal axis of conveyor 2. As will be explained in more detail, arm 20 or 21 in their second position causes that particular arm's conveyor associated therewith (either 4 or 6) to become powered, as well as power being applied to belt 31 (of either arm 20 or 21) by activation of motor 18 or 19.

A packaged workpiece will break the light path above described and the passage of the packaged workpiece will cause the light path to be reestablished. Once the light path is reestablished, subsequent to it being broken, the arm associated with it is caused to be moved from its second to its first position. As will be further explained in more detail, when an arm reaches its first position, the conveyor (4 or 6) associated with it is turned off (after the passage of a predetermined length of time), the appropriate control on-off switch is reset to the on position, and the photoelectric cell and station light (elements 22 or 23) associated with the arm are turned off. From the above description, it will be appreciated that an operator can arbitrarily select anyone of those stations (and conveyor assemblies associated with therewith) generally denoted by station lights 22 or 23 to which he can send a particular packaged workpiece. He can choose 22 or 23 or can repeat the same one as many times as desired or mix them up in any desired permutation or combination.

Reference is now made to FIGS. 3 through 10 for a more detailed explanation of the mechanical brain 24. Brain 24 is composed of two upstanding confronting spaced-apart outer members 66 and 65. Roterably journaled in outer members 65 and 66 is axle 54 and on axle 54 is affixed disc 75 and gear 49, which has teeth members 69 on its outer periphery. Gear 47 drives gear 49 which rotates axle 54 that rotates disc 75. In pillow bearings 63 there is rotatably journaled a worm gear denoted by elements 48 and 47. Element 47 has a helical groove therein into which the teeth 69 of gear 49 are received. Worm gear 47-48 is affixed to drive 64, which in turn (not shown) is engaged with the drive (not shown) of conveyor 2 in such a manner that the gear ratio of gears 47 and 49, linear speed of conveyor 2 the rotation of disc 75, the rotation of worm gear 47-48, the rotation of gear 49, all are a function of the distance between the spot where a particular workpiece is placed on conveyor 2 and station 22 or 23 as the case may be. This speed-distance relationship is such that the photoelectric cell of a given station is turned on by brain 24 as described below just prior to (but not before) a packaged workpiece arriving at a station chosen by the operator. Such choice arises out of the operator turning on either the first control or second control on-off switch, elements 77 and 78 respectively.

In between spaced apart outer members 65-66 is disposed disc 75 on the outer periphery of which there are disposed a plurality of plates 56, movably affixed to disc 75 by band 55. Plates 56 are slidable relative to one another and disc 75. Displaced plates 56 are hereafter referred to as plates 76. See FIGS. 5 and 8. Affixed to the inner surface of outer members 65-66 are shims 58 and 57 respectively. These are strategically disposed so that when disc 75 rotates they engage plates 76 and realign them back to that alignment shown by FIG. 10, but only after plates 76 engage arm 61 or 62 of one of brain switches 50 or 53 (depending upon the station chosen by the operator). First striker member 51 and its arm 60 and first brain switch 50 with its arm 62 are affixed to outer member 65. In like manner second striker member 52 and its arm 59 and second brain switch 53 and its arm 61 are affixed to outer member 66.

First striker member 51 is pneumatically in communication with the first control on-off switch 77 and second striker member 52 is in pneumatic communication with second control on-off switch 78. Placing the first control on-off switch 77 in the on position causes first striker member 51 to be activated (pneumatically) causing striker arm 60 to strike a predetermined number of plates 56 (the number depending on the width of striker arm 60) causing them to slide relative to the balance of the unstruck plates to form a protrusion. See element 76 of FIG. 5. Protrusion 76 rotates with disc 75 and because of its rotational speed relationship with the linear speed of conveyor 2 and the distance a workpiece has to travel to reach the station desired, this protrusion comes in contact with second brain switch arm 61 just prior to the packaged workpiece reaching conveyor 4. After second brain switch 53 is turned on to create a light path between elements 10 and 11, protrusion 76 engages shim 57 and the plates forming protrusion 76 are moved (see FIG. 8) to that position shown in FIG. 10. Plates 56 are made of any suitable metal and may be coated with a plastic such as a fluropolymer to facilitate their sliding relationship. It will be appreciated that these plates are adapted to be moved from a first (FIG. 10) to a second position (see protrusion 76 of FIGS. 5 and 6) by first striker member 51 and from their second to their first position by use of shim 57. First striker member 51, its arm 60, second brain switch 53 and its arm 61, shim 57 and first control on-off switch 77 are associated with conveyor 4. Second striker member 52, its arm 59, second control on-off switch 78, shim 58, first brain switch 50 and its arm 62 are associated with conveyor 6. They all operate in the same manner. Second control on-off switch 78 is in pneumatic communication with second striker member 52 and by placing the second control on-off switch 78 in its on position, second striker member 52 is activated to form a protrusion, like element 76 of FIG. 5 but in the opposite direction, by moving a given number of plates 56 from a first to a second position. After this protrusion is created it contacts arm 62 and turns on first brain switch 50 to create a light path between elements 8 and 9 and then comes in contact with shim 58 causing the plates of the protrusion to move from their second to their first position in a manner similar to that first described for elements 51, 60, 53, 61 and 57.

Figure 10:
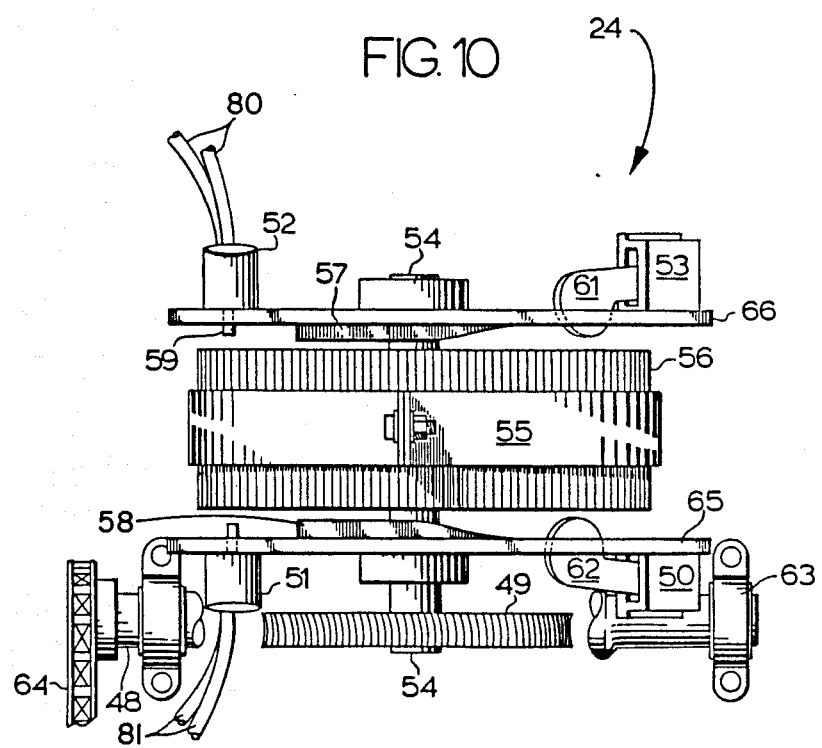
Figure 11:
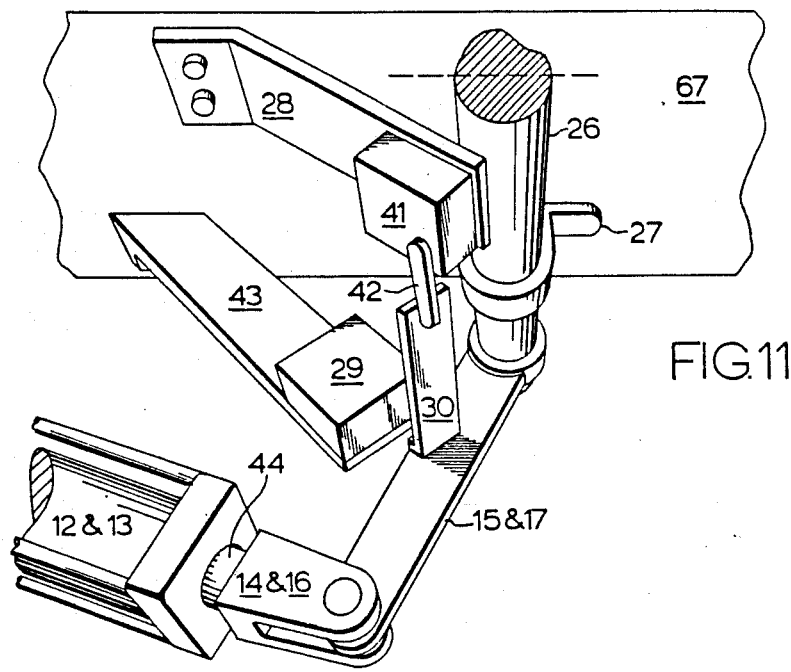
FIGS. 11 and 12 are partial perspective views of apparatus used to extend and retract the arms 20 and 21 of FIG. 1, 2 and 13.
Figure 12:
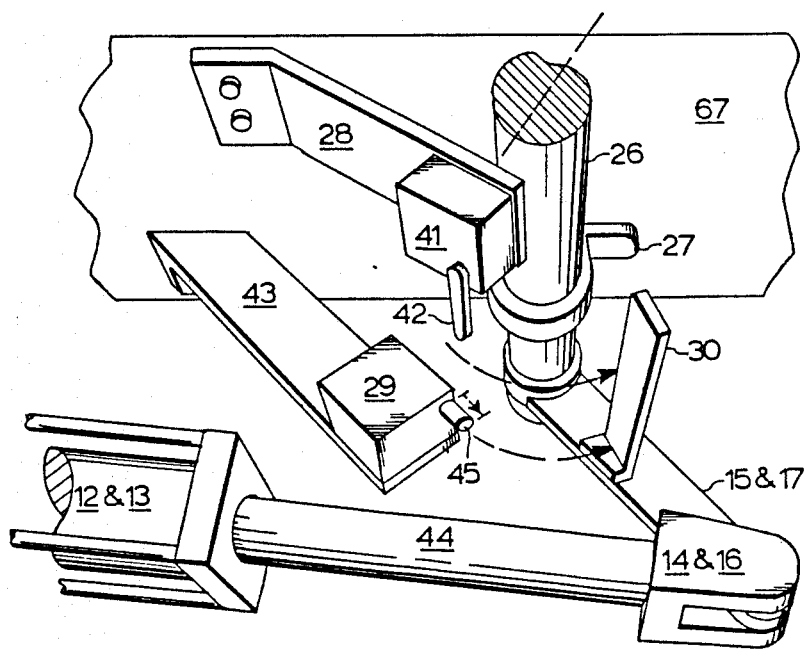
Figure 14:
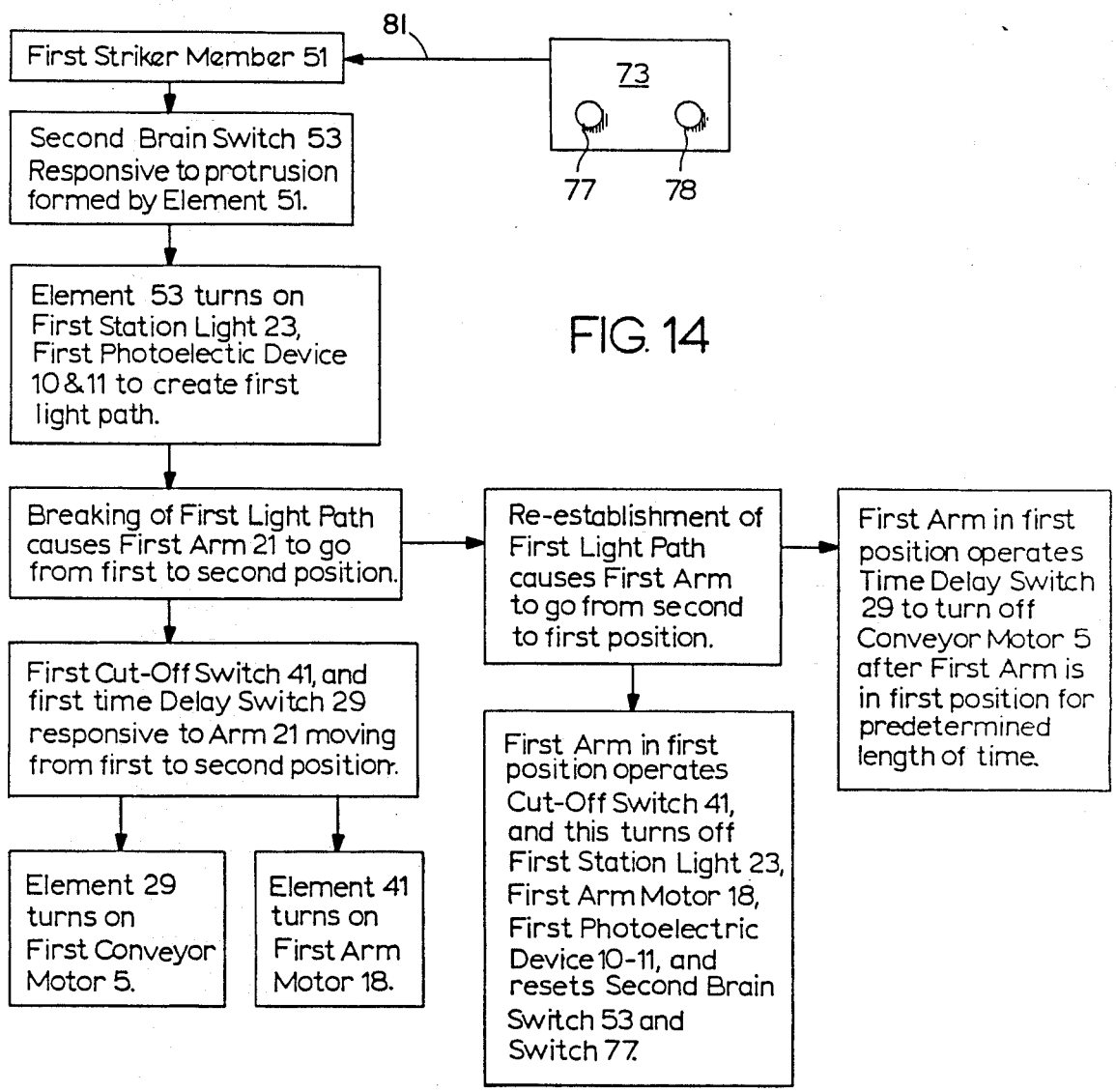
FIGS. 14 and 15 are schematic diagrams of certain parts of the conveyor and mechanical brain combination and their functional relationship with each other.
Figure 15:
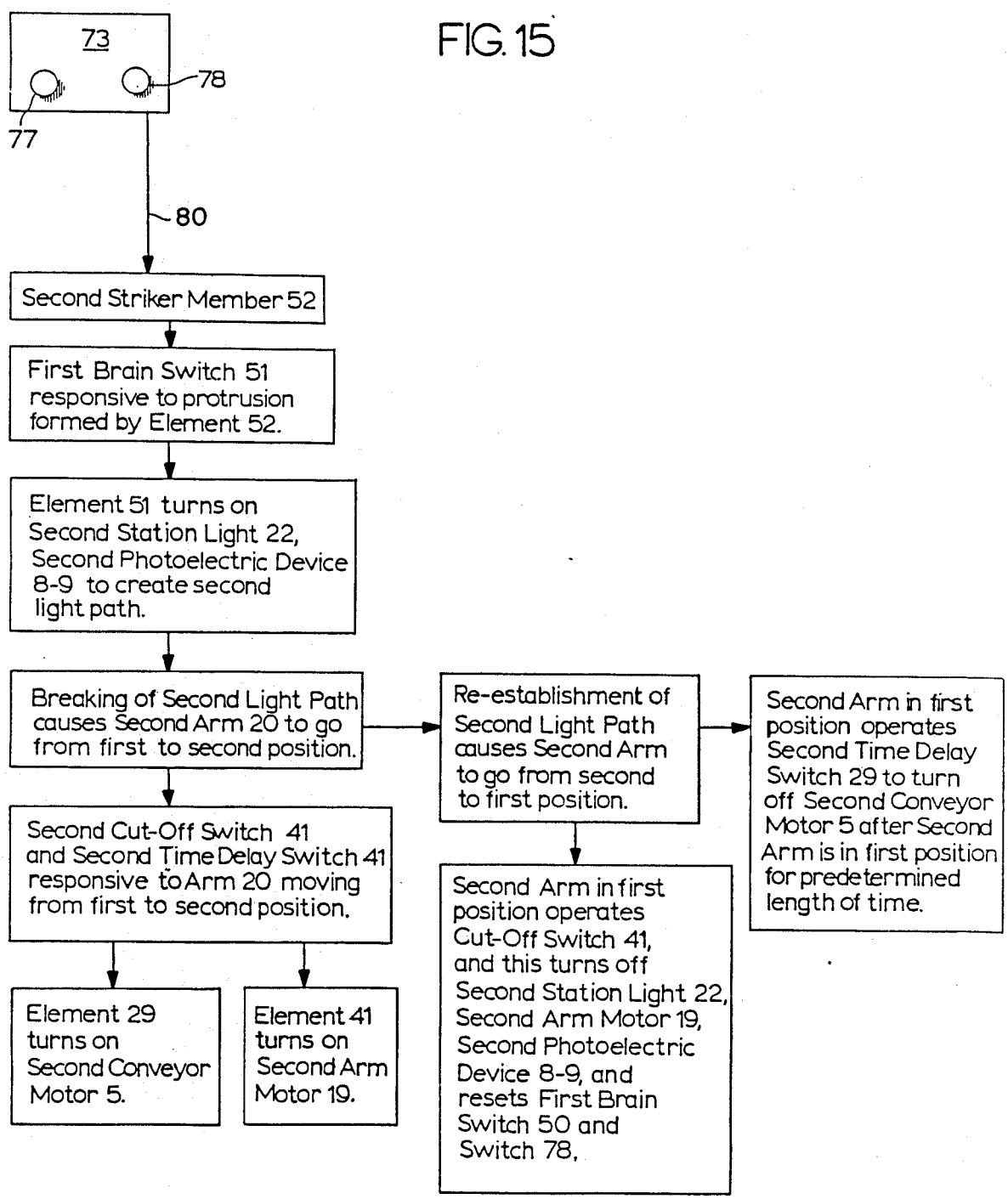

What will now be described is the structure and operation of the apparatus shown in FIGS. 11 and 12, keeping in mind that such apparatus and operation thereof are applicable to and exist at both conveyors 4 and 6. Referring to FIGS. 10, 14, 15, "on-off" switch 78 is in pneumatic communication with second striker member 52 and first striker member 51 is in pneumatic communication with "on-off" switch 77. Once second brain switch 53 is turned on, a circuit is completed (see FIG. 14) that includes a light path between photoelectric device 11 and reflector 10. When this light path is broken, hydraulic cylinder 12 is activated causing rod 44 to be extended from that position of FIGS. 2 and 11 to that of FIG. 12. As shown in FIGS. 11 and 12, one end of rod 44 is attached to cylinder 12 and the other end rotably affixed to yoke 14. One terminal part of linkage 15 is rotatively affixed in yoke 14 and the other terminal part is affixed to upstanding member 26. Element 26 is affixed to conveyor base 67 by pillow bearing 27 and is adapted to rotate therein. Conveyor base 67 is supported by legs 3. Bracket 34 affixes upstanding member 26 to arm member 46. Arm member 46 is pivotably attached to conveyor base 67. When rod 44 is in that position shown in FIG. 11, arm 21 pivots to its first position shown in solid lines in FIG. 2. When rod 44 is in the extended position shown by FIG. 12, arm 21 pivots to its second position, shown by dotted lines in FIG. 2. Bracket 28 is attached to conveyor base 67. Attached to one terminal end portion of bracket 28 is cut-off switch 41 having switch arm 42. Upstanding member 30 is affixed to linkage 15. Bracket 43 is affixed to conveyor base 67. Attached to a terminal end portion of bracket 43 is a time delay switch 29 like that disclosed in U.S. Pat. No. 4,522,999, the contents (description of said Time Delay Switch) of which are incorporated herein by reference.

When rod 44 is in its extended position (FIG. 12), switch arm 42 of cut-off switch 41 is rotated in a counterclockwise direction and plunger 45 of time delay switch 29 is released. By so doing, cut-off switch 41 causes motor 18 to be achieved causing belt 31 to rotate. Rotation of belt 31 facilitates the movement of packaged workpieces onto conveyor 4 and first conveyor motor 5 is turned on by a circuit through time delay switch 29. See FIG. 14. Rod 44 in its FIG. 11 position causes upstanding member 30 to depress plunger 45 of time delay switch 29. At the instant plunger 45 is depressed, time delay switch 29, which is in electrical communication with conveyor motor 5, does not immediately turn off motor 5, but turns conveyor motor 5 off after a predetermined length of time after plunger 45 is depressed. This time delay feature is disclosed in U.S. Pat. No. 4,552,999 previously referred to. The purpose of this is to clear any workpiece over conveyor 4 in anticipation of another workpiece being directed to the service area anticipation of another workpiece being directed to the service area served by the same conveyor. Cut off switch 41 is in electrical communication with the first control on-off switch 77, station light 23, second brain switch 53 and motor 18. It will be noted that when arm 21 is in its first position (FIG. 11) upstanding member 30 not only depresses plunger 45, but also rotates switch arm 42 of cut-off switch 41 clockwise. When switch arm 42 is so rotated, several things are accomplished: (a) first control on-off switch 77 is reset to its off position, (b) station light 23 is turned off, (c) second brain switch 53 is reset to its off position thereby turning off photoelectric device 11 and (d) motor 18 and rotation of belt 46 is stopped. Arm 20 operates in the same manner and has like elements as arm 21 except for the specific elements of brain 24 particularly associated with conveyor 6, namely elements 52, 59, 50, 62 and 58, and second control on-off switch 78 of control 73. See FIG. 15.

Figure 13:
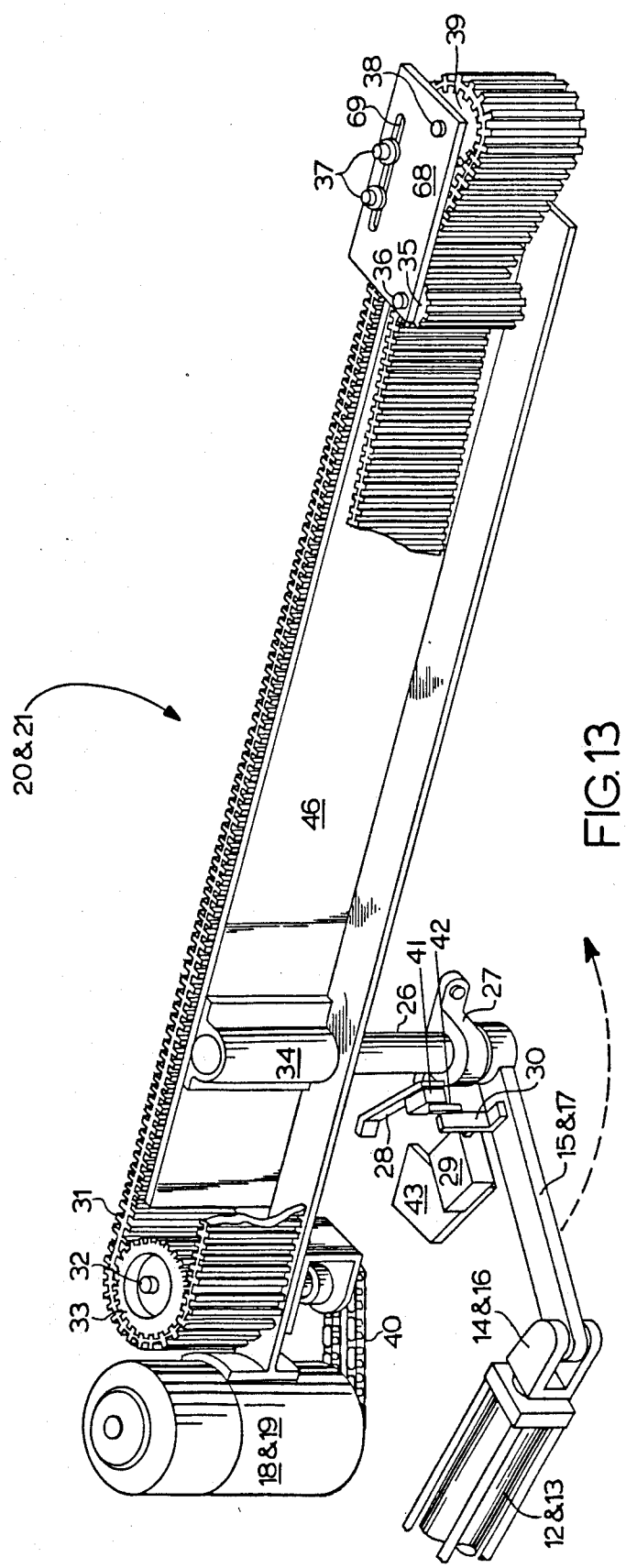
FIG. 13 is a detailed partial perspective view of arms 20 and 21 of FIGS. 1 and 2.

Turning to the construction of arms 20 and 21, FIG. 13 is instructive. Roller 39, rotatively journaled on axle 38, is disposed on arm member 46. Axle 38 is affixed to plate 68, a part of arm member 46. Drive roller 33, rotatively disposed on axle 32, is journaled in arm member 46. Both drive roller 33 and roller 39 have spaced apart drive teeth on their outer surface (unnumbered). Both sides of belt 31 are likewise configured. Spaced apart teeth of belt 31, drive roller 33 and roller 39, are intermeshed and engaged with one another. Motor 18 is mounted on arm 46. Drive chain 40 is connected to motor 18 and axle 32 and adapted to rotate same. Roller 35, configured like roller 39 and drive roller 33, is rotatively journaled on axle 36, which is affixed to plate 68 and arm member 48. Movement of switch arm 42 in the counter clockwise direction turns on motor 18 to drive chain 40 that rotates axle 32 that drives roller 33. Subsequent rotation of switch arm 42 in the clockwise direction turns off motor 18.

Slot 69 contains an adjustment device to tighten or loosen tension in belt 31. This device is a well known prior art and is affixed in place by bolts 37. The elements of arm 20 are the same as for arm 21 and both operate in the manner above described, differing only in that arm 20 initially responds to the breaking of a light path created by elements 9 and 18 whereas arm 21 responds initially to a breaking of a light path created by elements 10 and 11. Compare FIG. 14 to FIG. 15.

We claim:

1. A conveyor system composed of:
    (a) first and second conveyors, each having a longitudinal axis, the longitudinal axis of the second conveyor disposed at an angle to the longitudinal axis of the first conveyor;
    (b) a first arm pivotally attached to the first conveyor movable from a first position to a second position and from said second position to said first position, said first position being essentially parallel to the longitudinal axis of the first conveyor and said second position being transverse to the longitudinal axis of the first conveyor so that items conveyed by the first conveyor are shunted onto the second conveyor when the first arm is in said second position;
    (c) a first photoelectric device in electrical communication with the first arm for creating a first light path across the first conveyor;
    (d) a mechanical brain, in electrical communicatin with the first photoeletric device, and a control, having a first control on-off switch in communication with the mechanical brain, whereby upon activation of the first control on-off switch, a part of the mechanical brain is temporarily physically deformed to form a protrusion and the protrusion activates the first photoelectric device; and,
    (e) a first time delay switch and a first conveyor motor, the first time delay switch and the first conveyor motor being in electrical communication with one another and the first conveyor motor connected to the second conveyor to power same, the first time delay switch activatable when the first arm is in its second position and deactivatable after the passage of a predetermined length of time after the first arm is moved to said first position.

2. The conveyor system of claim 1, further including a first cut-off switch, a first arm motor, and a first arm belt, the first arm belt connected to the arm motor and powered by the first arm motor, the first cut-off switch, first arm motor, and the first photoelectric device in electrical communication with one another, and the first cut-off switch disposed so that when the first arm is positioned in its first position, the first cut-off switch deactivates the first arm motor and the first photoelectric device.

3. The conveyor system of claim 1 wherein the first arm is in communication with the first light path and responsive to an interruption of the first light path to move the first arm from its first to its second position and upon reestablishment of the first light path to move the first arm from its second position to its first position.

4. The conveyor system of claim 1 wherein the mechanical brain comprises a rotatable disc, a plurality of plate members in a first position movably disposed on the periphery of the disc and adapted to be displaced to a second position, a first striker member disposed in confronting relationship to the plate members in communication with and responsive to the first control on-off switch, said striker member having an arm thereon adapted to move a first number of the plate members from their first position to a second position upon activation of the first control on-off switch, and a shim member adapted to come in contact with the first number of plate members while they are in their second position to move them from their second position to their first position upon rotation of the rotatable disc.

5. The conveyor of claim 4 including:
    (a) a third conveyor having a longitudinal axis, the longitudinal axis of the third conveyor disposed at a angle to the longitudinal axis of the first conveyor;
    (b) a second position arm pivotally attached to the first position conveyor movable from a first position to a second position and from said second position to said first position, said first position being essentially parallel to the longitudinal axis of the first conveyor and said second position being transverse to the longitudinal axis of the first conveyor so that items conveyed by the first conveyor are shunted onto the third conveyor when the second arm is in its second position and the first arm is in its first position; and, (c) a second photoelectric device in electrical communication with the second arm to create a second light path across the first conveyor; and, wherein the mechanical brain is in electrical communication with the second photoelectric cell and the control has a second control on-off switch in communication with the mechanincal brain whereby upon activation of the second control on-off switch, a part of the mechanical brain is temporarily physically deformed to form a protrusion and the protrusion is adapted to activate the second photoelectric device.

6. The conveyor system of claim 5 wherein the second arm is in communication with the second light path and is responsive to an interruption of the second light path to move from its first to its second position and upon the reestablishment of the second light path to be moved from its second position to its first position.

7. A conveyor system of claim 4 wherein the mechanical brain further includes a second striker member disposed in confronting relationship to the plate members in communication with and responsive to the second control on-off switch and has a member thereon to move a second number of the movable plate members from their first position to their second position, and another shim member adapted to come in contact with said second number of plate members while they are in the second position to move them from their second to their first position upon rotation of the rotatable disc.

8. The conveyor system of claim 5, further including a second time delay switch and a second conveyor motor, the second time delay switch and the second conveyor motor in electrical communication with one another and the second conveyor motor connected to the third conveyor for powering same, the second time delay switch activatable when the second arm is in said second position and further deactivatable after the passage of a predetermined length of time after the second arm is moved to said first position.

9. The conveyor system of claim 2 further including the first control on-off switch in electrical communication with the first cut off switch whereby when the first cut off switch is deactivated the first control on-off switch is rendered to its off position.

10. The conveyor system of claim 5 further including a second control on-off switch in the control, the second on-off switch in electrical communication with the second cut-off switch whereby when the second cut-off switch is deactivated the second control on-off switch is rendered to its off position.

* * * * *